(12) United States Patent
Metin et al.

(10) Patent No.: US 12,389,923 B2
(45) Date of Patent: Aug. 19, 2025

(54) SHORTENING WITH CRYSTALLINE FAT

(71) Applicant: Cargill, Incorporated, Wayzata, MN (US)

(72) Inventors: Serpil Metin, Eden Prairie, MN (US); Paul Raymond Smith, Waterloo (BE); Fernanda Zaccarelli Davoli, Golden Valley, MN (US)

(73) Assignee: Cargill, Incorporated, Wayzata, MN (US)

( * ) Notice: Subject to any disclaimer, the term of this patent is extended or adjusted under 35 U.S.C. 154(b) by 539 days.

(21) Appl. No.: 17/599,062

(22) PCT Filed: Mar. 27, 2020

(86) PCT No.: PCT/US2020/025214
§ 371 (c)(1),
(2) Date: Sep. 28, 2021

(87) PCT Pub. No.: WO2020/198585
PCT Pub. Date: Oct. 1, 2020

(65) Prior Publication Data
US 2022/0174973 A1   Jun. 9, 2022

Related U.S. Application Data

(60) Provisional application No. 62/825,135, filed on Mar. 28, 2019.

(51) Int. Cl.
*A23D 9/05* (2006.01)
*A21D 2/16* (2006.01)
*A21D 13/80* (2017.01)

(52) U.S. Cl.
CPC .............. *A23D 9/05* (2013.01); *A21D 2/165* (2013.01); *A21D 13/80* (2017.01)

(58) Field of Classification Search
CPC ............ A23D 9/05; A21D 13/80; A21D 2/165
(Continued)

(56) References Cited

U.S. PATENT DOCUMENTS

2009/0119977 A1\* 5/2009 Murphy .................. C11C 5/002
44/275
2010/0203219 A1\* 8/2010 Debonte .................. A23D 9/02
426/438
(Continued)

FOREIGN PATENT DOCUMENTS

CN     106922850 A     7/2017
CN     108024550 A     11/2021
(Continued)

OTHER PUBLICATIONS

Onyema et al, Effects of Refining Processes on the Physicochemical Properties of Some Selected Vegetable Oils; American Chemical Science Journal 12(4):1-7 (Year: 2016).\*

*Primary Examiner* — Brent T O'Hern

(57) ABSTRACT

Described herein is a crystalline fat comprising a powder density ranging from about 0.04 g/mL to about 0.40 g/mL at room temperature and at least 50% of particles have a particle size ranging from 10 to 50 µm in diameter. Also described herein is a shortening comprising crystalline fat having a powder density ranging from about 0.04 g/mL to about 0.40 g/mL at room temperature and at least 50% of particles have a particle size ranging from 3 to 60 µm in diameter and a liquid oil; wherein the crystalline fat ranges from about 25 wt % to about 99.9 wt % and the liquid oil ranges from about 0.1 wt % to about 75 wt %.

19 Claims, 8 Drawing Sheets

(58) Field of Classification Search
USPC .......................................................... 426/549
See application file for complete search history.

(56) References Cited

U.S. PATENT DOCUMENTS

| | | |
|---|---|---|
| 2010/0209588 A1 | 8/2010 | Loh |
| 2010/0317734 A1* | 12/2010 | Folan ........................ A61P 1/02 |
| | | 514/558 |
| 2011/0244111 A1 | 10/2011 | Den Adel |
| 2014/0154394 A1 | 6/2014 | Arfsten et al. |
| 2016/0128347 A1 | 5/2016 | Buter |
| 2018/0249729 A1* | 9/2018 | Kataoka ................... A23D 9/05 |

FOREIGN PATENT DOCUMENTS

| | | | |
|---|---|---|---|
| EA | 24216 | A | 5/2013 |
| EA | 30608 | A | 9/2014 |
| EP | 0294974 | A2 | 12/1988 |
| EP | 1736059 | A1 | 12/2006 |
| EP | 3354138 | A1 | 8/2018 |
| JP | 2017526383 | A | 9/2017 |
| RU | 2559435 | C2 | 8/2015 |
| WO | 2012079955 | A1 | 6/2012 |
| WO | 2012089676 | A1 | 7/2012 |
| WO | 2014/087724 | A1 | 6/2014 |
| WO | 2016010421 | A2 | 1/2016 |
| WO | 2017051910 | A1 | 3/2017 |
| WO | 2018224546 | A1 | 12/2018 |
| WO | 2023/200956 | A1 | 10/2023 |
| WO | 2023/200965 | A1 | 10/2023 |

* cited by examiner

S1

S3

S5

S8

SHORTENING WITH CRYSTALLINE FAT

CROSS REFERENCE TO RELATED APPLICATIONS

This application is a national phase application of PCT/US2020/025214, filed Mar. 27, 2020, which claims the benefit of U.S. Provisional Application No. 62/825,135, filed Mar. 28, 2019, which are hereby incorporated by reference in their entirety.

TECHNICAL FIELD

This invention relates to crystalline fat and methods of manufacturing the same.

BACKGROUND

As consumers and regulatory authorities are demanding healthier foods. Hence, there is a desire to make shortenings traditionally used in bakery applications healthier as well without losing its functionality.

SUMMARY

Described herein is a crystalline fat comprising a powder density ranging from about 0.04 g/mL to about 0.40 g/mL at room temperature and at least 50% of particles have a particle size ranging from 10 to 50 μm in diameter. Also described herein is a shortening comprising crystalline fat having a powder density ranging from about 0.10 to about 0.30 at room temperature and at least 50% of particles have a particle size ranging from 10 to 60 μm in diameter and a liquid oil; wherein the crystalline fat ranges from about 25 wt % to about 99.9 wt % and the liquid oil ranges from about 0.1 wt % to about 75 wt %.

BRIEF DESCRIPTION OF THE SEVERAL VIEWS OF THE FIGURES DRAWING(S)

FIGS. 1A-D shows images of some of the shortening compositions described herein.

FIG. 2 demonstrates the particle size of various crystalline fats described herein.

FIG. 3 demonstrates the powder densities of the various crystalline fats described herein.

Figure 1A:
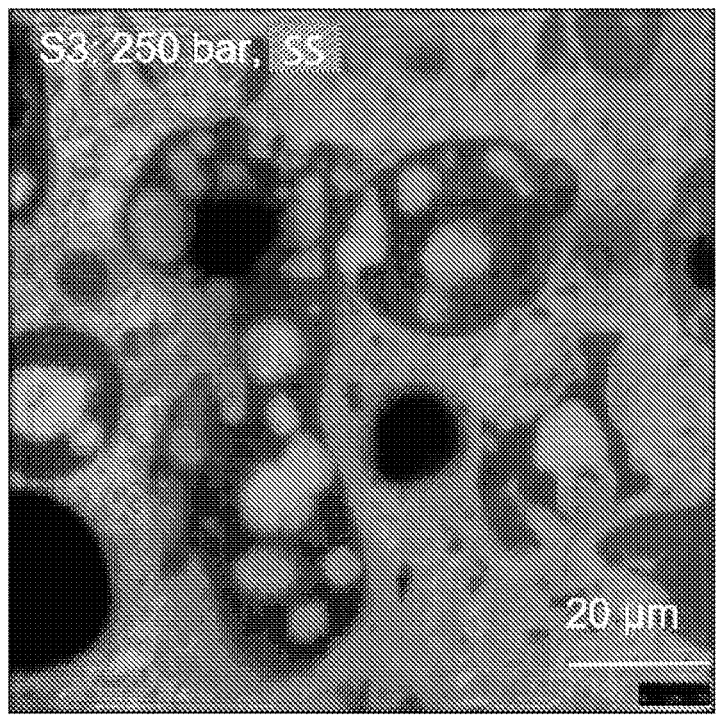
Figure 1B:
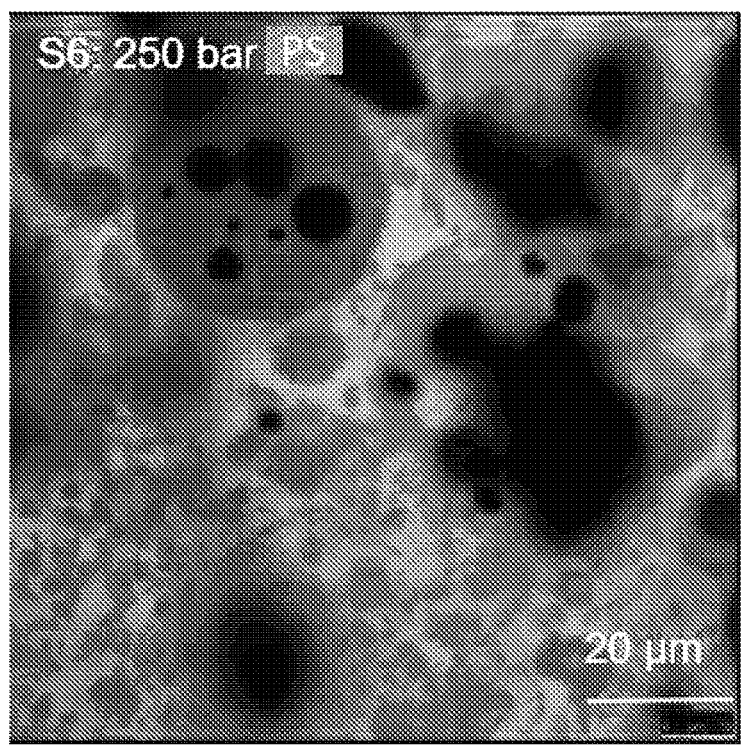
Figure 1C:
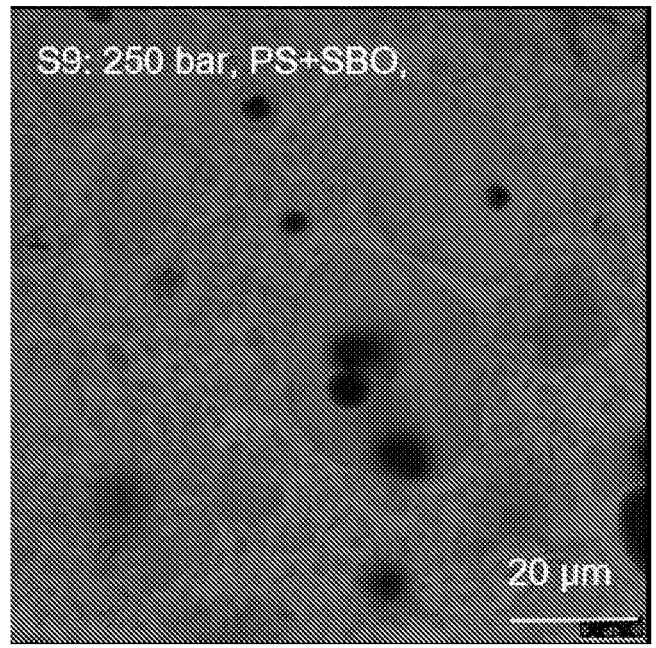
Figure 1D:
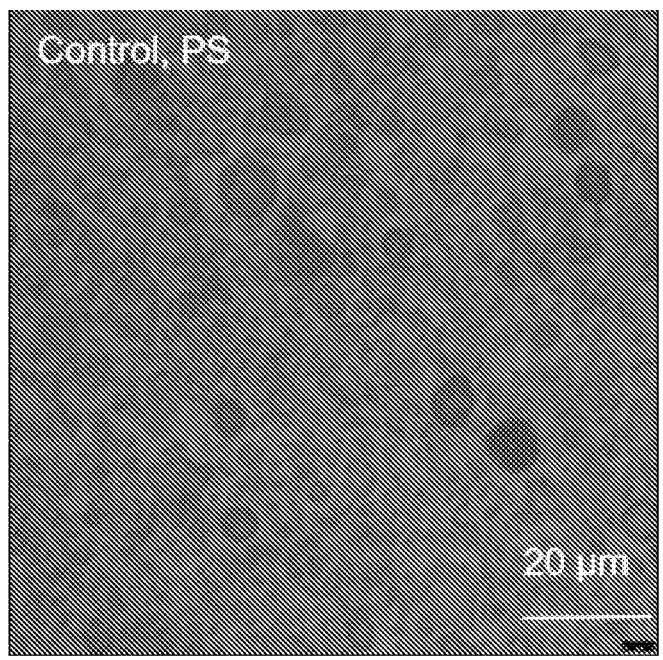

FIGS. 9A-D show images of some of the shortening compositions described herein.

DETAILED DESCRIPTION

Described herein is a shortening having functional structure and performance. Specifically, the shortening described herein has potential to be healthier because it can reduce the amount of saturated fat compared to traditional shortenings yet maintains the texture expected of shortenings.

The shortening comprises a crystalline fat and a liquid oil, wherein the crystalline fat ranges from about 25 wt % to about 99.9 wt % and the liquid oil ranges from about 0.1 wt % to about 75 wt %. In other aspects, the crystalline fat ranges from about 30-80 wt % with the liquid oil making up the remainder. In other, perhaps more preferred, aspects, the crystalline fat ranges from about 40-60 wt % with the liquid oil making up the remainder. Crystalline fat is defined as solid at room temperature and liquid oil is liquid at room temperature.

In some aspects, the crystalline fat is derived from the group consisting of palm oil, shea, palm kernel oil, coconut oil, mango kernel oil, illipe, babassu oil, pequi oil, borneo tallow, allanblackia oil, cocoa butter, nut oils, animal fat, dairy fat, sunflower oil, corn oil, soybean oil, canola oil, rapeseed oil, cottonseed oil, rice bran oil, safflower oil, flaxseed oil, peanut oil, olive oil, tall oil, and its fractions, its high oleic versions and combinations thereof. In some aspects, the crystalline fat is derived from fully or partially hydrogenated and/or interesterified oils.

The crystalline fat described herein is typically porous in structure and in powder form. Scanning electron microscope (SEM) images show the crystalline fat can be hollow to indented in structure (pitted). Crystalline fat particles are very neat, and typically are spherical in shape with an open spongy structure. In other aspects, the crystalline fat can be seen as foam like in structure with air-filled morphology. The porous or "fluffy-like" structure of the crystalline fat described herein is beneficial because it allows for a greater oil-holding capacity which subsequently enables more liquid oil to be added to the shortening composition (described herein). In aspects where the crystalline fat is well packed or closely packed, the oil-holding capacity is not as great.

The crystalline fat of the present invention is made using a supercritical $CO_2$ technology. The fat is either melted at a temperature ranging from at least about 5 to about 25, degrees above the melting temperature of the fat, and in some aspects at least about 5 to about 20 degrees above the melting temperature of the fat, and in other aspects at least about 5 to about 15 degrees above the melting temperature of the fat, and in yet other aspects at least about 5 to about 10 degrees above the melting temperature of the fat or the fat may be a combination of hard fat and liquid oil and may not require additional melting. The fat is then saturated with $CO_2$ to obtain a mixture and such mixture is pressured at the $CO_2$ triple point to achieve supercritical $CO_2$. This causes the fat to be solubilized. This is then sprayed causing the crystallization/solidification/micronizing/atomization of the fat as the $CO_2$ evaporates. This creates crystalline fat. This is typically done in a batch process and the temperature is adjusted to that which is lower than the melting point of the fat to ensure the fat is in solid, powdered form.

The crystalline fat has a density ranging from about 0.04 g/mL to about 0.40 g/mL at room temperature, in some aspects from about 0.05 g/mL to about 0.30 g/mL at room temperature, and in preferred aspects has a density ranging from 0.10 g/mL to about 0.25 g/mL at room temperature. This density range allows for a greater oil-holding capacity, unlike compacted fat structures. It shall be understood that reference to "density" herein means bulk density (also referenced as apparent density or volumetric density), which is a property of powders, granules, and other divided solids. It is defined as the mass of many particles divided by the total volume.

The crystalline fat has an oil holding capacity of at least 5%, and in some examples at least 10% and up to about 75%, and in some aspects up to about 80% of the weight of the fat. Oil holding capacity means that after mixing the crystalline fat with the liquid oil no phase separation (oiling-off) is observed, the liquid oil is held within the powder fat structure by absorption, adsorption and/or entrainment phenomena.

The crystalline fat also has a particle size distribution wherein at least 50%, in some examples at least 60%, in some examples of least 70%, in some examples at least 80%, and in some examples at least 90% (depending on the type of fat) of the particles have a particle size ranging from 3 to 60 μm in diameter, 5 to 50 μm in diameter, and in some aspects 10 to 60 μm in diameter.

Conventional shortenings may contain high amounts of saturated fats. It is well known that excessive consumption of saturated fats can lead to cardiovascular problems. Therefore, there is a drive to reduce the amount of saturated fat in the diet. Structuring by means of such crystalline fat particles allows a reduced consumption of saturated fat and an increased consumption of heart healthier unsaturated fats. These properties are desired because they will allow the production of functional shortenings, in terms of structure and mechanical properties, while containing high amounts of liquid oil. Liquid oils are rich in monosaturated and unsaturated fatty acid which are much healthier based on the nutrition guidelines. The new shortening produced with crystalline fat will contain less saturated fat, which is the conventional fat used to structure and give functionality to bakery shortening.

The shortening comprises the crystalline fat and a liquid oil. Because of the properties of the crystalline fat, liquid oil is able to fill inside the various pockets of the fat. The crystalline fat particles can then form a structured fat system whether by means of sintering or other interactions (absorption, adsorption and/or entrainment). This enables the creation of shortening systems with lower quantities of saturated fats. This means that shortenings prepared in this way are more heart healthy. The fact that they require lower amounts of saturated fats to structure them means that the need for hydrogenated and/or tropical fats is reduced. As such these shortenings are more desirable to the consumer because they can have a clean label and may be viewed as more friendly for the environment. Conventional shortenings are generally manufactured by means of a scraped surface heat exchanger (SSHE). The SSHE is the heart of the crystallization line in which the shortening is chilled and crystallized. Pin rotor machines or intermediate crystallizers can be used in combination or individually. These kneading units are employed in order to yield mechanical work to the shortening and hereby ensure homogeneity. The steps of a conventional shortening manufacturing process are: fat phase melt, chilling, crystallization, kneading and packing. This is an energy-intensive process. The micronization process described herein is a lower energy process. Therefore, the environmental impact of the crystalline fat-based shortenings is lower than that of conventional shortenings. It shall be understood that the shortening composition is also distinguishable from other shortenings because it does not require an added emulsifier to maintain its stability. The crystalline fat structure and the liquid oil filling the various pockets remain stable over typical shelf-life periods required for shortening.

The liquid oil can be for example but not limited to soybean oil, sunflower oil, rapeseed oil, canola oil, palm olein, palm super olein, corn oil, cottonseed oil, rice bran oil, safflower oil, flaxseed oil, peanut oil, olive oil, tall oil, or its high oleic versions. In some aspects, the liquid oil is high oleic liquid oil thus making a high oleic shortening. In nearly all aspects, the liquid oil is not the hard or solid fraction of palm oil. In all aspects, the liquid oil is in a liquid state at room temperature. The liquid oil may contain up to 5% of emulsifier such as propylene glycol ester, polyglycerol ester, lecithin, monoglyceride, polysorbate or lactic acid ester of monoglyceride or its combinations. In all aspects, the liquid oil even when added with emulsifier is in a liquid state at room temperature.

The shortening of the present invention can be used for (but is not limited to) baked goods, confectionaries, fillings, dough products, chocolate spreads, nut butters, and microwaved popcorn, meat alternatives, or milk or dairy fat replacers.

EXAMPLES

Example 1: Palm Stearin and Soybean Oil Shortening Compositions

An objective of this example is to simulate production of shortening by mixing crystalline fat with oil.
10 samples of crystalline fat are prepared:
S1-S3: palm super stearin ("SS") at 80, 150 and 250 bar of pressure, respectively.
S4-S6: palm stearin ("PS") at 80, 150 and 250 bar of pressure, respectively.
S7-S9: palm stearin ("PS") (70%) blended soybean oil ("SBO") (30%) at 80, 150 and 250 bar of pressure, respectively.
S10: palm stearin ("PS") (70%) blended soybean oil ("SBO") (30%) at 250 bar and reduced cooling temperature.

Table 1 demonstrates the shortening compositions. Note that the amount of liquid oil added is considered to be the oil holding capacity.

TABLE 1

| Test | Shortening Composition | |
|---|---|---|
| | Crystalline fat | Liquid oil |
| 1 | 27% S1 | 73% soy oil |
| 2 | 27% S2 | 73% soy oil |
| 3 | 27% S3 | 73% soy oil |
| 4 | 35% S4 | 65% soy oil |
| 5 | 35% S5 | 65% soy oil |
| 6 | 35% S6 | 65% soy oil |
| 7 | 50% S7 | 50% soy oil |
| 8 | 50% S8 | 50% soy oil |
| 9 | 50% S9 | 50% soy oil |
| 10 | 50% S10 | 50% soy oil |

The traditional process of crystallization includes heating fat and oil to a temperature of up to 60° C. and crystallizing under shear with cooling to about 15° C. The process utilized for this example includes gradually adding crystalline fat into liquid oil under slow manual agitation until all fat is incorporated to create the shortening composition. The shortening composition sits for about 1 hour to check for texture and phase separation. Images of some of the shortening compositions are shown in FIG. 1A-D. The darker spots so where the oil is located within the crystalline fat.

Figure 2:
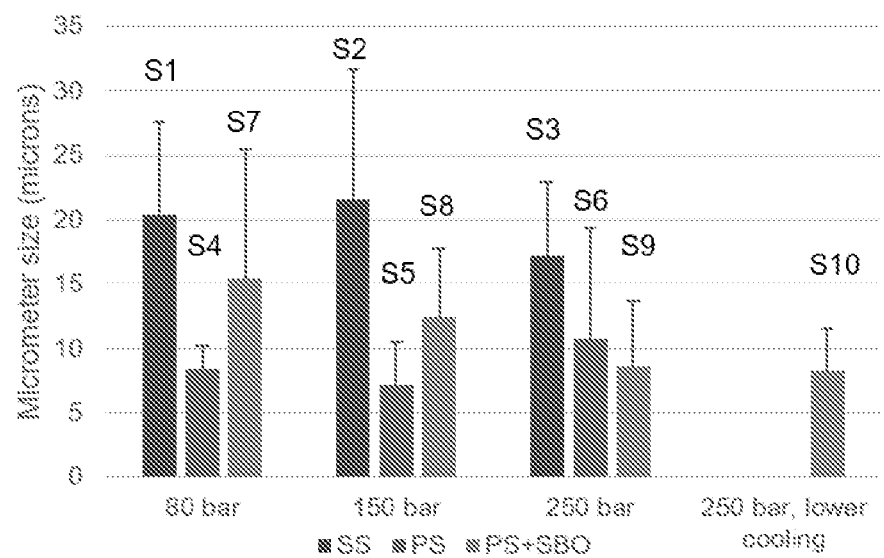
Figure 3:
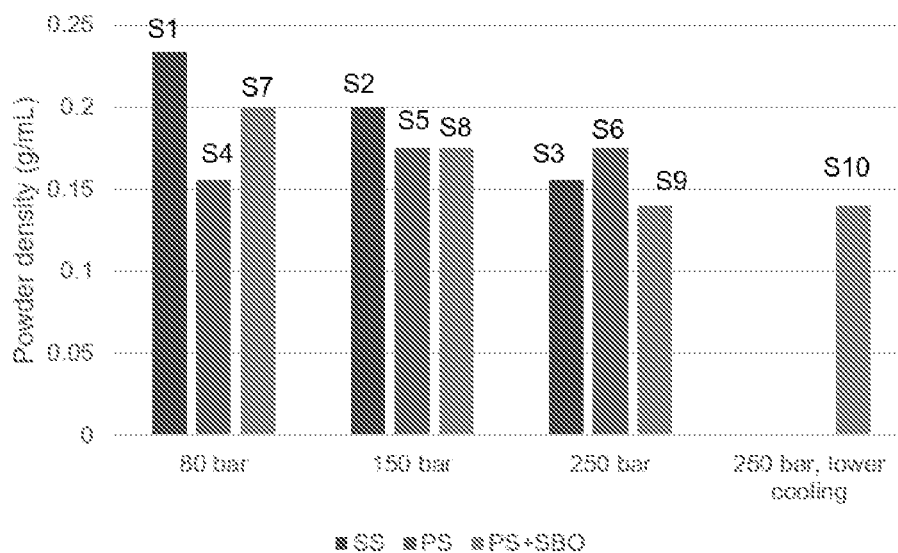

FIG. 2 demonstrates the particle size of the various crystalline fats and FIG. 3 demonstrates the powder densities of the various crystalline fats.

Example 2: Applications Testing in Cookies and Laminated Biscuits

Shortenings were prepared by blending crystalline fat with liquid oil at room temperature and allowing to rest for 6 days. The various samples are demonstrated in Table 2.

TABLE 2

| Sample | Shortening final composition |
|---|---|
| Control | 35% PS, 65% SBO |
| Test 3 (contain S3) | 27% SS, 73% SBO |
| Test 6 (contain S6) | 35% PS, 65% SBO |
| Test 9 (contain S9) | 35% PS, 65% SBO |

Figure 4:
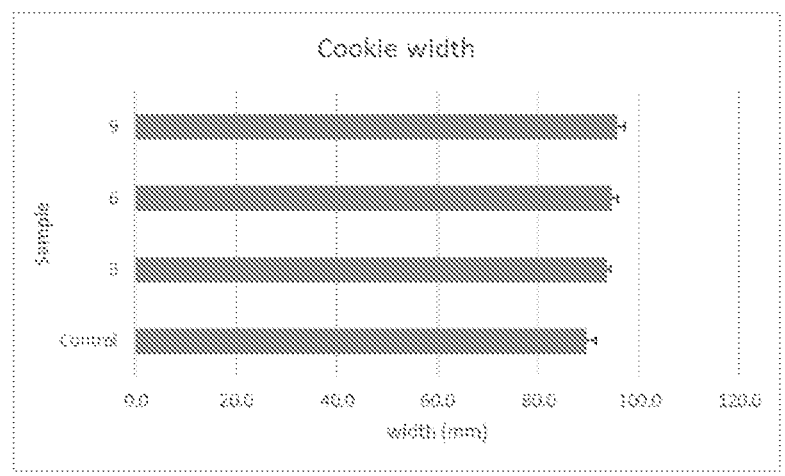
FIGS. 4 and 5 show width and height of cookies comprising the shortening described herein.
Figure 5:
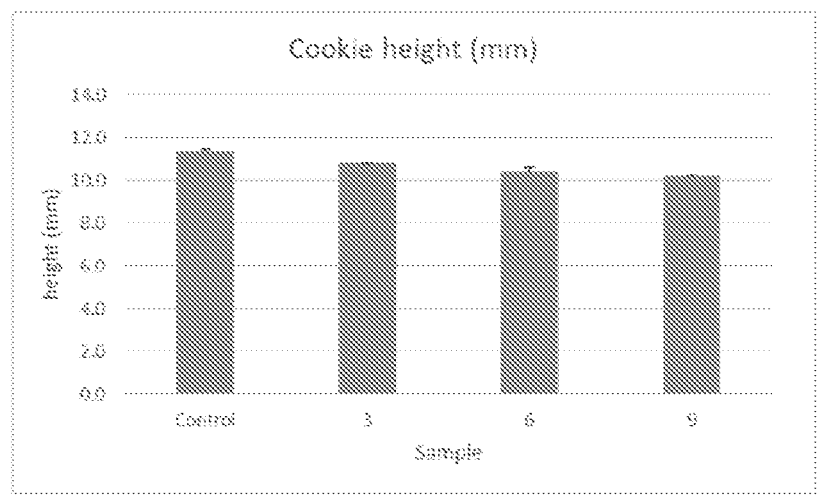
Figure 6:
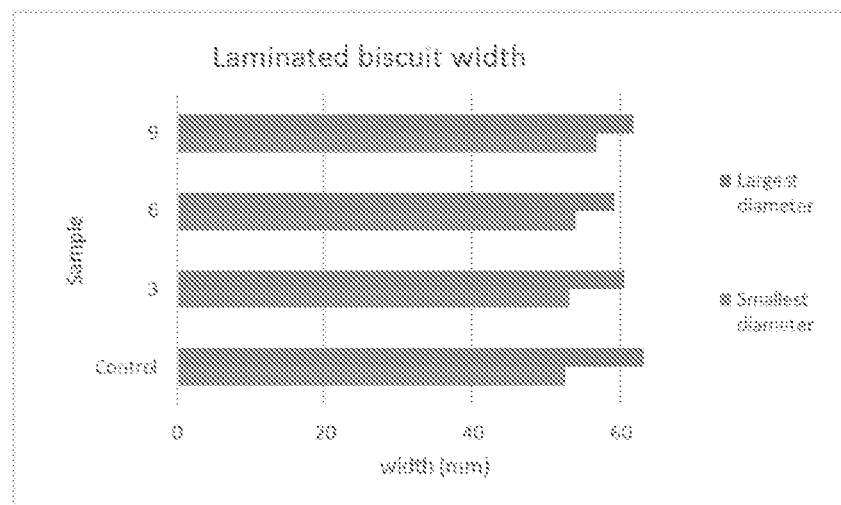
FIGS. 6 and 7 show width and height of laminated biscuits comprising the shortening described herein.
Figure 7:
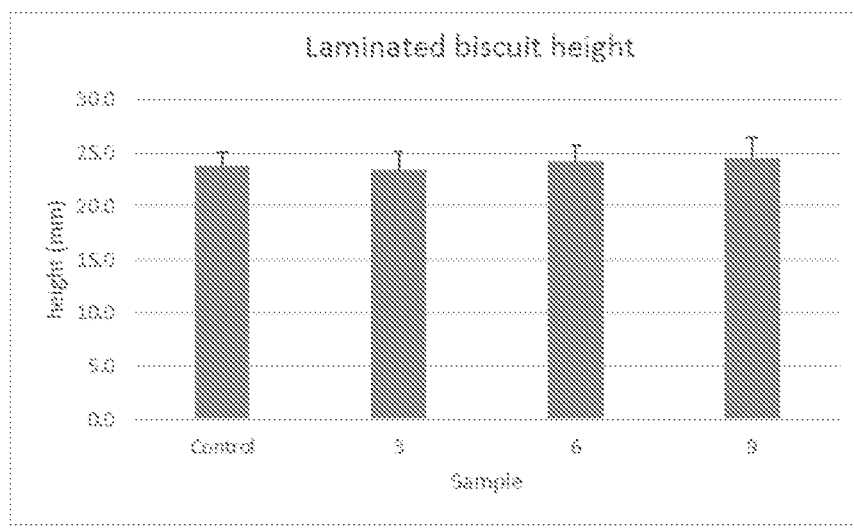

As illustrated in FIGS. 4 and 5, the cookie width and cookie height are similar to the control. As illustrated in FIGS. 6 and 7, the laminated biscuit width and height are similar to the control. Both applications testing indicates the shortening comprising the crystalline fat is a good replacement for traditional shortenings.

The cookie formulation is in Table 3 and the laminated biscuit recipe in Table 4.

TABLE 3

| Ingredient | % |
|---|---|
| Sugar | 28.75 |
| Shortening | 18.75 |
| Baking Soda | 0.65 |
| Salt | 0.50 |
| Eggs | 7.00 |
| HFCS 42DE | 5.75 |
| Vanilla | 0.66 |
| Molasses | 0.44 |
| Pastry Flour, unbleached | 18.75 |
| Cake Flour | 18.75 |

TABLE 4

| Ingredient | % |
|---|---|
| 1ST STAGE | |
| Hard Flour, Artisan | 52.0 |
| Shortening | 6.0 |
| Water | 30.9 |
| Xanthan | 0.2 |
| Datem | 0.3 |
| Turmeric extract, color | 0.025 |
| 2ND Stage | |
| SAPP 4 | 1.2 |
| SALP (Levin-Lite) | 0.2 |
| Sodium Bicarbonate | 1.0 |
| Salt | 1.3 |
| Sugar | 4.0 |
| Dextrose | 3.0 |

Example 3: Shortenings Made with Crystalline Fat

Figure 8:
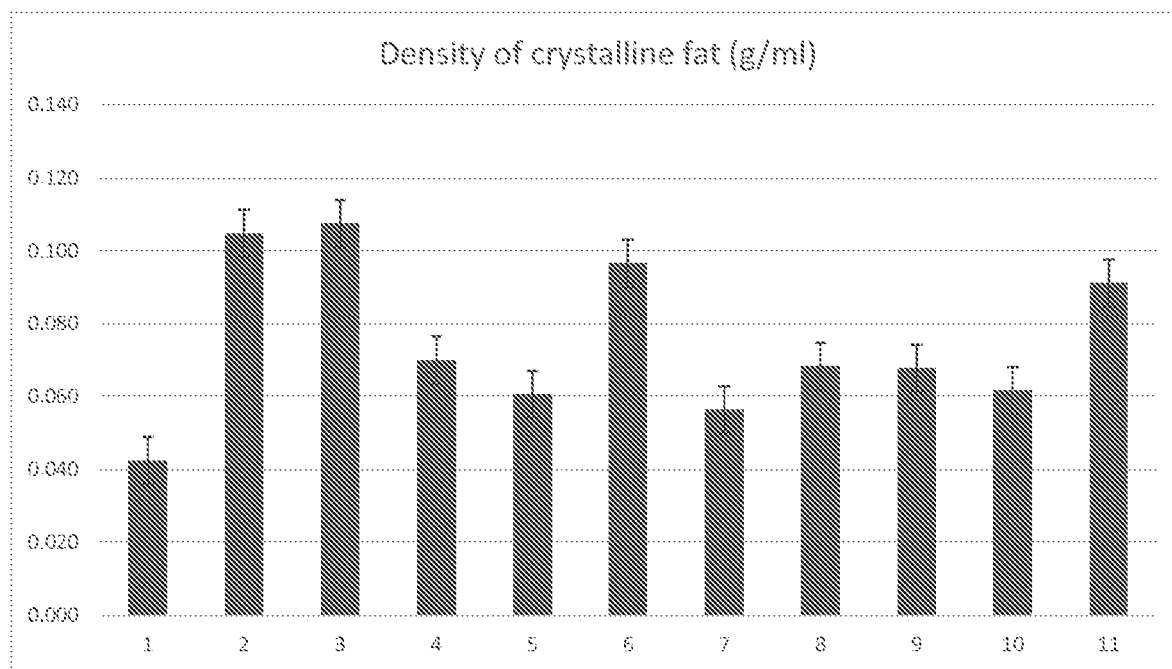
FIG. 8 shows the density of various crystalline fats described herein.
Figure 9A:
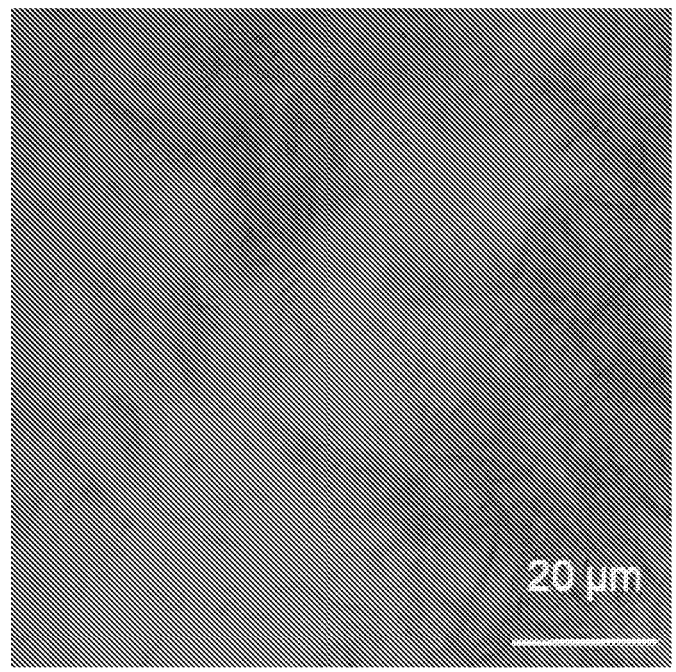
Figure 9B:
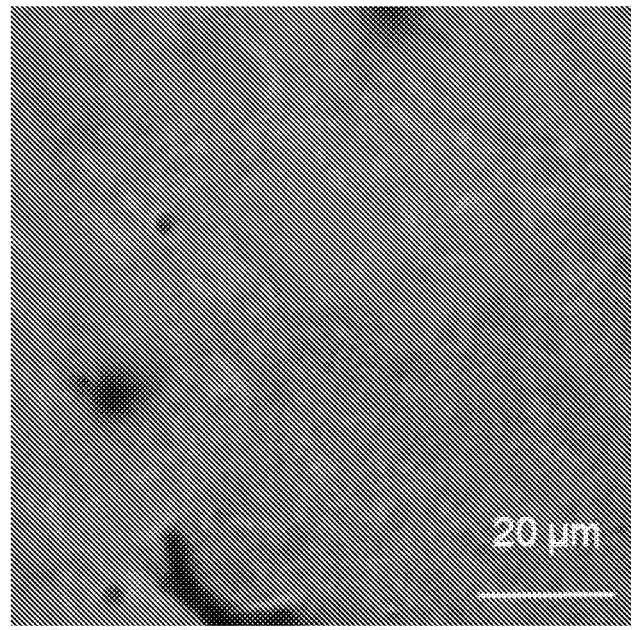
Figure 9C:
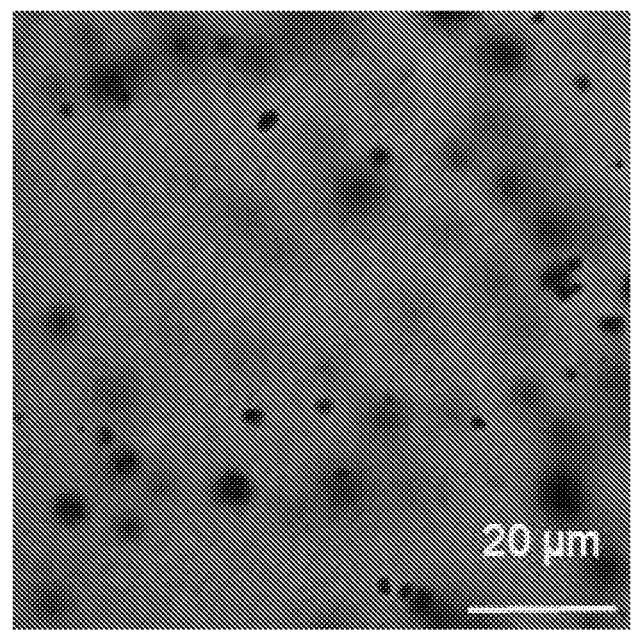
Figure 9D:
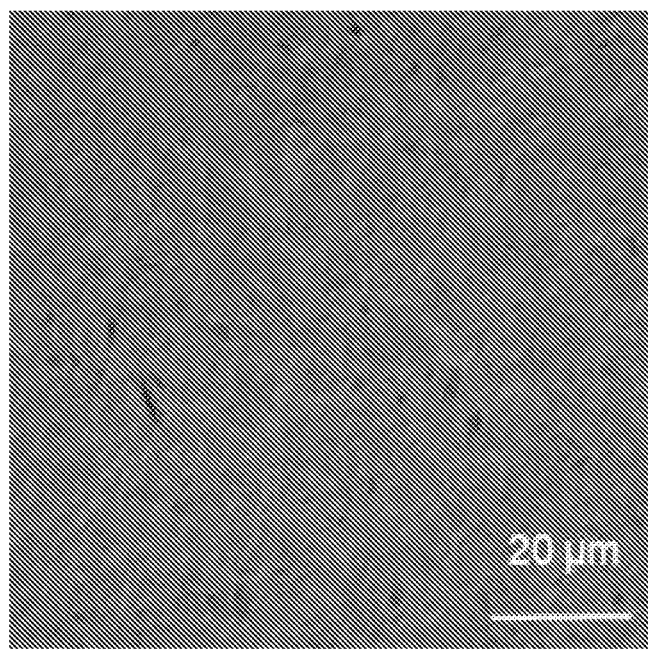

This example shows a variety of crystalline fat which were prepared under specific pressure conditions, followed by the composition of shortening preparation utilizing the referred crystalline fats. Table 5 shows the crystalline fats compositions and the correspondent processing conditions and FIG. 8 provides the density of the crystalline fats.

TABLE 5

| Test | Crystalline fat composition | Pressure (bar) |
|---|---|---|
| 1 | Inter-esterified (55% coconut oil + 45% cocoa butter) | 100 |
| 2 | 70% Palm stearin + 30% rapeseed oil | 100 |
| 3 | Inter-esterified (50% fully hydro sunflower + 50% coconut oil) | 100 |
| 4 | Inter-esterified (50% fully hydro sunflower + 50% coconut oil) | 250 |
| 5 | Inter-esterified cocoa butter | 250 |
| 6 | Inter-esterified palm stearin | 100 |
| 7 | Inter-esterified palm stearin | 250 |
| 8 | Palm stearin | 250 |
| 9 | Cocoa butter | 250 |
| 10 | Fully hydrogenated high erucic rapeseed oil | 250 |
| 11 | 70% Inter-esterified palm stearin + 30% sunflower oil | 250 |

Shortenings were prepared by blending the crystalline fats with liquid oil. Rapeseed oil was used as liquid oil phase. Table 6 shows the shortenings compositions.

TABLE 6

| Shortening | Crystalline fat composition | Liquid oil (rapeseed oil) |
|---|---|---|
| S1 | 60% crystalline fat - test 1 | 40% |
| S2 | 50% crystalline fat - test 2 | 50% |
| S3 | 50% crystalline fat - test 3 | 50% |
| S4 | 50% crystalline fat - test 4 | 50% |
| S5 | 50% crystalline fat - test 5 | 50% |
| S6 | 70% crystalline fat - test 5 | 30% |
| S7 | 70% crystalline fat - test 6 | 30% |
| S8 | 50% crystalline fat - test 7 | 50% |
| S9 | 30% crystalline fat - test 8 | 70% |
| S10 | 50% crystalline fat - test 8 | 50% |
| S11 | 50% crystalline fat - test 9 | 50% |
| S12 | 20% crystalline fat - test 10 | 80% |
| S13 | 50% crystalline fat - test 11 | 50% |

The invention claimed is:

1. A shortening comprising:
a crystalline fat comprising fat particles; and
liquid fat,
wherein the fat particles are porous and have a spherical shape and a powder density ranging from about 0.04 g/mL to about 0.40 g/mL at room temperature, at least 50% of the fat particles having a particle size ranging from 3 to 60 μm in diameter.

2. The shortening of claim 1, wherein the powder density of the crystalline fat is in a range from about 0.05 g/mL to about 0.30 g/mL at room temperature.

3. The shortening of claim 1, wherein the crystalline fat has an oil holding capacity in a range from about 5% to about 80% of the weight of the crystalline fat.

4. The shortening of claim 1, wherein the shortening comprises from about 25 wt % to about 99.9 wt % of the crystalline fat.

5. The shortening of claim 1, wherein the shortening comprises from about 0.1 wt % to about 75 wt % of the liquid fat.

6. The shortening of claim 1, wherein the crystalline fat comprises no emulsifier.

7. The shortening of claim 1, wherein the liquid fat comprises up to 5% of emulsifiers comprising propylene glycol ester, polyglycerol ester, lecithin, monoglyceride, polysorbate, lactic acid ester of monoglyceride, or a combination thereof.

8. A shortening comprising:
from about 25 wt % to about 99.9 wt % of a crystalline fat comprising porous fat particles and having a powder density ranging from about 0.04 g/mL to about 0.40 g/mL at room temperature, at least 50% of the fat particles having a particle size ranging from 3 to 60 μm in diameter; and from about 0.1 wt % to about 75 wt % of a liquid oil.

9. The shortening of claim 8, wherein the crystalline fat is in a powder form.

10. The shortening of claim 8, wherein the powder density of the crystalline fat ranges from 0.05 g/mL to about 0.30 g/mL.

11. The shortening of claim 8, wherein the powder density of the crystalline fat ranges from 0.10 g/mL to about 0.25 g/mL at room temperature.

12. The shortening of claim 8, wherein the crystalline fat has an oil holding capacity ranging from about 5% to about 80% of the weight of the crystalline fat.

13. The shortening of claim 9, wherein the crystalline fat comprises no emulsifier.

14. The shortening of claim 8, wherein the shortening is made by a process comprising:

forming the porous fat particles of the crystalline fat from a solid fat selected from the group consisting of palm oil, palm stearin, shea, palm kernel oil, coconut oil, mango kernel oil, illipe, babassu oil, pequi oil, borneo tallow, allanblackia oil, cocoa butter, nut oils, animal fat, dairy fat, sunflower oil, corn oil, soybean oil, canola oil, rapeseed oil, cottonseed oil, rice bran oil, safflower oil, flaxseed oil, peanut oil, olive oil, and combinations thereof.

15. The shortening of claim 8, wherein the shortening is made by a process comprising forming the porous fat particles of the crystalline fat from fully or partially hydrogenated and/or interesterified oils.

16. The shortening of claim 8, wherein the shortening is made by a process comprising blending the liquid oil with the crystalline fat, wherein the liquid oil is selected from the group consisting of soybean oil, sunflower oil, rapeseed oil, canola oil, palm olein, palm super olein, corn oil, cottonseed oil, rice bran oil, safflower oil, flaxseed oil, peanut oil, and olive oil.

17. The shortening of claim 8, wherein the liquid oil comprises up to 5% of emulsifiers as propylene glycol ester, polyglycerol ester, lecithin, monoglyceride, polysorbate or lactic acid ester of monoglyceride or its combinations.

18. The shortening of claim 8, wherein the shortening is made by a process comprising blending the liquid oil with the crystalline fat, wherein the liquid oil is selected from the group consisting of soybean oil, sunflower oil, rapeseed oil, canola oil, corn oil, cottonseed oil, rice bran oil, safflower oil, flaxseed oil, peanut oil, and olive oil.

19. The shortening of claim 8, wherein the shortening is made by a process comprising blending the liquid oil with the crystalline fat, wherein the liquid oil is a high oleic liquid oil.

* * * * *